US008940816B2

(12) United States Patent
Servant et al.

(10) Patent No.: US 8,940,816 B2
(45) Date of Patent: Jan. 27, 2015

(54) MASTER BATCH FOR CERAMIC- OR METAL-POWDER INJECTION-MOLDING, AND METHOD FOR PREPARING SAID MASTER BATCH

(71) Applicant: Commissariat a l'Energie Atomique et aux Energies Alternatives, Paris (FR)

(72) Inventors: Florence Servant, Vaulnaveys le Haut (FR); Pascal Tiquet, Villeurbanne (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/928,546

(22) Filed: Jun. 27, 2013

(65) Prior Publication Data

US 2013/0289184 A1    Oct. 31, 2013

Related U.S. Application Data

(63) Continuation of application No. PCT/FR2011/052746, filed on Nov. 24, 2011.

(30) Foreign Application Priority Data

Jan. 6, 2011 (FR) ...................................... 11 50095

(51) Int. Cl.
```
C08L 23/06      (2006.01)
B22F 1/00       (2006.01)
B22F 3/20       (2006.01)
B22F 3/22       (2006.01)
C04B 35/48      (2006.01)
C08K 5/01       (2006.01)
C08K 5/06       (2006.01)
C08K 5/09       (2006.01)
```

(52) U.S. Cl.
CPC .............. *C08L 23/06* (2013.01); *B22F 1/0077* (2013.01); *B22F 3/20* (2013.01); *B22F 3/225* (2013.01); *C04B 35/48* (2013.01); *B22F 1/0059* (2013.01); *C08K 5/01* (2013.01); *C08K 5/06* (2013.01); *C08K 5/09* (2013.01)
USPC ............................................ 523/351; 419/65

(58) Field of Classification Search
CPC ......... C08L 23/06; B22F 1/0059; B22F 3/225
USPC ...................... 419/65, 67; 523/351
See application file for complete search history.

(56) References Cited

U.S. PATENT DOCUMENTS

| | | | |
|---|---|---|---|
| 4,207,226 A | | 6/1980 | Storm |
| 4,721,599 A | | 1/1988 | Nakamura |
| 5,098,942 A | | 3/1992 | Menke et al. |
| 5,135,977 A | * | 8/1992 | Achikita et al. ............. 524/183 |
| 5,254,613 A | | 10/1993 | Bayer et al. |
| 5,417,756 A | | 5/1995 | Bayer et al. |
| 5,531,958 A | | 7/1996 | Krueger |
| 6,008,281 A | | 12/1999 | Yang et al. |
| 6,264,863 B1 | | 7/2001 | Schwartz et al. |

FOREIGN PATENT DOCUMENTS

| | | |
|---|---|---|
| EP | 0 587 953 A1 | 3/1994 |
| EP | 0 599 285 A1 | 6/1994 |
| ES | 2167130 A1 | 5/2002 |
| KR | 2008033620 A * | 4/2008 |
| PT | 102147 A | 12/1998 |
| WO | 2010/058371 A1 | 5/2010 |
| WO | WO 2010058371 A1 * | 5/2010 |
| WO | 2010/072396 A1 | 7/2010 |

OTHER PUBLICATIONS

Hsu et al., "Effect of wax composition on injection molding of 304L stainless steel powder," Powder Metallurgy, vol. 37, Issue 4, 272-276 (1994) (SciFinder abstract). AN 1995:307987, CAN 122:86061.*
KR 2008033620 A (2008), machine translation, Korean Patent Information Online Network (K-PION).*
Gerling et al., "Metal Injection Moulding Using Intermetallic γ-TiAl Alloy Powder," Adv. Eng. Mater., vol. 3, No. 6, pp. 387-390 (2001).*
Bozzelli et al., "Injection Molding," Encyclopedia of Polymer Science and Technology, 4th Ed., John Wiley & Sons, Inc. (2011).*
J.A. Molefi et al., *Investigation of Thermally Conducting Phase-Change Materials Based on Polyethylene/wax Blends Filled with Copper Particles*," Journal of Applied Polymer Science, Jan. 1, 2010 (Abstract Only).
Chartier, T., Ferrato, M. and Baumard, J. F. (1995), "*Supercritical Debinding of Injection Molded Ceramics*," Journal of the American Ceramic Society, vol. 78, Issue 7, pp. 1787-1792 (Abstract only).
I. Krupa, et al., "*Phase Change Materials Based on Low-Density Polyethylene/Paraffin Wax Blends*," European Polymer Journal, vol. 43, Sep. 10, 2007, pp. 4695-4705.
Shibo Guo, et al., "*Powder Injection Molding of Pure Titanium*," Journal Rare Metals, Jun. 1, 2009, vol. 28, Issue 3, pp. 261-265 (Abstract Only).
International Search Report dated Feb. 1, 2012.

* cited by examiner

*Primary Examiner* — Susannah Chung
*Assistant Examiner* — Josephine Chang
(74) *Attorney, Agent, or Firm* — Burr & Brown, PLLC

(57) ABSTRACT

The master batch for molding includes at least one inorganic powder, advantageously ceramic or metallic; an organic mixture, advantageously polymer, comprising: a stable polymer having good ductility features, from 30 to 90% by mass of the mixture; a lubricant, from 5 to 30% by mass of the mixture; a plasticizing polymer, from 5 to 30% by mass of the mixture; with a [% by mass of the lubricant]/[% by mass of the stable polymer] ratio smaller than or equal to 1, advantageously strictly smaller than 1.

14 Claims, No Drawings

MASTER BATCH FOR CERAMIC- OR METAL-POWDER INJECTION-MOLDING, AND METHOD FOR PREPARING SAID MASTER BATCH

BACKGROUND OF THE INVENTION

1. Field of the Invention

The present invention relates to the forming of parts by powder injection molding techniques (PIM), and more specifically to the preparation of master batches (feedstocks) used for injection or extrusion molding.

More specifically, the present invention relates to a master batch of well-determined composition, particularly adapted to the targeted application, and especially to the thermal debinding of molded parts.

2. Description of Related Art

Injection molding techniques (PIM, or microPIM in the case of ultra-fine powders) are currently used to form various objects. Powder injection molding is a method in several steps which combines molding by injection of plastics and the hardening used in powder metallurgy by any type of sintering. It enables to form metal and ceramic components.

In such a method, the first step comprises obtaining a master batch (or feedstock) adapted to the targeted application. The feedstocks are made of a mixture of organic material (or polymer binding agent) and of inorganic powders (metal or ceramic).

Then, the feedstock can be injected like a thermoplastic. Finally, the part is debound and then sintered.

More specifically, feedstocks made of polymer materials, used as a binding agent, and of metal or ceramic powders, are formed at high temperature and injected into a mold. This results in an injected part made of powder-filled polymer, called "green" part. Such a green part has the same shape as the final part but with larger dimensions.

The polymers which have been used to allow the injection of the material then have to be extracted by debinding. The binding agents are thus extracted, after which the resulting "brown" part is sintered to be hardened and densified while homothetically keeping the shape of the "green" part. This results in ceramic and metal parts.

There exist various types of debinding according to the chemical and/or physical composition of the polymers used: catalytic debinding, thermal debinding, solvent, water, or supercritical $CO_2$ debinding.

The catalytic debinding comprises placing the green parts in an inert and very acid atmosphere (nitric or oxalic acid) in an oven. The polymers used in this case are based on polyacetal (for example, polyoxymethylene). Formulations adapted for such a catalytic debinding are for example described in document U.S. Pat. No. 5,531,958.

Thermal debinding is considered as quite simple from a physical point of view, but quite long (up to 60 hours). Despite the disadvantage of the debinding time, it is widely used for many compositions (for example, in documents U.S. Pat. Nos. 5,254,613, 5,417,756, EP 0 599 285, 4,207,226, or ES2167130).

The debinding with a non-polar solvent enables to extract non-polar polymers such as paraffin, polyethylene wax, and more generally of low molecular mass. The solvents used for example are hexane, xylene, toluene. They may also be a combination of several solvents (for example, hexane, trichloromethane, and ethanol) to further remove stabilizers, compatibilizing agents, stearic acid, and others, which are widely used in polymers.

The debinding is then performed by Soxhlet-type chemical extraction. This method, although it uses harmful chemical products, has the advantage of emitting no gas into the atmosphere and of debinding the parts by vaporization-condensation of the solvent. The latter can thus be used again from one debinding to another. The use of filters retaining the extracted polymers allows a debinding with a solvent specific to each cycle.

A chemical debinding may also be used complementarily with other methods, especially thermal debinding or water debinding methods, which enables to improve the kinetics of the general process.

Water extraction debinding also has the advantage of decreasing the emission of gas into the environment, originating from the thermal degradation caused by incineration, and of decreasing the use of solvents or of acids hazardous for the health. Mixtures based on water-debindable polymers are more and more frequently used, as described in documents U.S. Pat. Nos. 6,008,281, 6,264,863, PT102147, 5,098,942, or WO 2010/058371.

Finally, supercritical $CO_2$ debinding, which is currently being developed, enables to extract polymers from feedstocks. It comprises debinding at low temperature and under a $CO_2$ pressure, rapidly and without creating defects (Chartier et al., J. Am. Ceram. Soc. 1995, 78, 1787-1792).

Once debound, the part called "brown" part is extremely fragile. It is current in the art to only partially debind the part before carrying out the sintering, to be able to handle it between the two steps. In this case, a temperature holding period is added during the sintering to totally debind the part. The sintering is carried out in an oven according to current densification processes used in powder metallurgy, that is, a thermal cycle and an atmosphere specific to each material to be sintered.

One of the main elements for the success of a crack-free part having the desired shape and details is the chemical composition of the binding agent used in the feedstock. The mixture should be sufficiently fluid to be injected and molded, and should have a good mechanical hold to be able to strip off and to handle the green part. It is also important to mix a maximum amount of powder with the binding agent, that is, to have a high filler ratio. The filler ratios vary according to the size of the powder and to its chemical and/or physical properties but generally range between 40 and 75% by volume. On materials which have trouble densifying, it is important to increase to a maximum the powder filler ratio in the feedstock.

Most chemical components used to form feedstocks which debind thermally (or in hybrid fashion: thermally and with a solvent, or thermally and with water) comprise a mixture of one or several polymers with paraffin wax and a dispersing agent.

The stable polymers used are semi-crystalline thermoplastics and generally polyolefines, such as polyethylene (low density, high density, linear low density), polypropylene . . . . However, once mixed with a large amount of powder, the mixture is no longer fluid enough to be injected and molded.

To improve the fluidity of the mixture, paraffin (saturated wax) or other unsaturated waxes may be inserted. The paraffin wax is relatively miscible in the polymer matrix with which it is mixed. The portion which is miscible in the stable polymer enables to fluidify the mixture and the other portion of the wax accumulates at the grain boundaries and enables to lubricate at a macroscopic scale the chamber of the extruder or of the injection press. I. Krupa et al. (European Polymer Journal, 43, 2007, p. 4695-4705) explain that the miscibility of the wax depends on the length of the carbon chain of the wax and also on the selected polyethylene (LLDPE or LDPE). To obtain a feedstock with a high filler ratio while keeping a good fluidity of the feedstock, it is necessary to introduce a high quantity of wax in the mixtures.

Guo et al. (Rare metals, vol 28 No 3, June 2009, p. 261) use formulations mainly comprising paraffin. However, a paraffin ratio which is too high, that is, much greater than its solubility in the other polymers used, results in wax accumulation areas at the grain boundaries, which weakens the green part on ejection.

Other formulations involve a smaller quantity of paraffin together with PEG (Poly-Ethylene Glycol), to debind a portion of the part with water rather than thermally. In this case, the compositions are formed with a large majority of PEG of low molar mass (WO 2010/058371, EP 0587 953), which may however result in a lack of hold of the part.

The addition of PEG, which is a small-chain molecule, provides mobility to the large chains of the LDPE polymer, while maintaining the general cohesion due to the hydrogen bonds, and behaving as a plasticizer in the mixtures. It is only very slightly miscible with aliphatic compounds and provides some elasticity to the mixture.

Further, Borealis, the world leader for polyethylene, has described in document WO 2010/72396 a formulation, for the field of electric cables, of a mixture of LDPE and PEG. A method for mixing with chemically incompatible components (for example, LDPE and PEG, the latter being called water-based additive or water tree retardant), but with a sufficient homogeneity to provide the properties expected for the application, that is, a resistant coating of the cables. Typically, it is advocated to insert a quantity smaller than 50% by weight, preferentially smaller than 30%, advantageously ranging between 1.5% and 20%, or even between 2% and 15% of PEG having a molar mass ranging between 4,000 g/mol and 35,000 g/mol, in LDPE.

Anyway, there is an obvious need to develop new feedstock formulations for injection or extrusion molding, compatible with available debinding processes, and especially thermal debinding.

SUMMARY OF THE INVENTION

The present invention relates to a master-batch composition usable for injection or extrusion molding, which, after having been mixed with metal or ceramic powders, enables to provide metal or ceramic parts. More specifically, the master batch according to the invention is characterized by the following compounds:
- at least one inorganic powder, advantageously ceramic or metallic;
- an organic mixture, advantageously polymer, comprising:
  - a hold homo- or co-polymer having good ductility features;
  - a lubricant;
  - a plasticizing polymer.

The inorganic powder or the mixture of inorganic powders present in the master batch according to the invention is conventionally made of ceramic or metal powders.

A ceramic powder for example is partially yttria-stabilized zirconia powder. A metal powder for example is a copper powder.

It may be nanometric (particle size smaller than 100 nm) or micrometric powders.

Typically, the inorganic powder(s) amount(s) to from 40 to 75% by volume of the master batch.

The organic mixture advantageously is a ternary mixture formed of the three above-mentioned ingredients, that is:
- a hold homo- or co-polymer having good ductility features;
- a lubricant;
- a plasticizing polymer.

Preferably, the master batch further comprises a dispersing agent. This enables to bind the powder to the polymers and the non-miscible polymers.

The dispersing agent advantageously is octadecanoic acid, more commonly called stearic acid (from the carboxylic acid family). Oleic acid or palmic acid may also be used.

It advantageously has a density ranging between 0.8 and 1.01 g/cm$^3$.

The added quantity of dispersing agent, and especially of stearic acid, depends on the grading of the powder but advantageously varies between 1 and 20% by mass of the organic mixture, advantageously formed of the three above-mentioned ingredients. In other words, for 100% by mass of the organic mixture, from 1 to 20% of dispersing agent are added.

According to another preferred embodiment, the organic mixture and advantageously the dispersing agent are polymers.

Advantageously, the master batch according to the invention comprises neither solvent, especially organic, nor water.

More advantageously still, the master batch contains, in addition to the powder, only the three previously-mentioned components of the organic mixture and possibly the dispersing agent.

In adapted fashion, the stable polymer has good ductility features, that is, a deformation at failure greater than 300%, more advantageously still greater than 500%. In practice, it advantageously is a polymer such as LLDPE ("Linear Low Density PolyEthylene"), that is, a linear low density polymer.

Advantageously, LLDPE is characterized by a molar mass advantageously ranging between 5,000 and 400,000 g/mol.

The branching ratio of the used LLDPE is advantageously smaller than 50 per 1,000 carbons, preferably smaller than 10 per 1,000 carbons. This provides good ductility features, even with a high powder filler ratio in the mixture.

The density of the used LLDPE advantageously ranges between 0.88 and 0.94 g/cm$^3$, more advantageously still between 0.91 and 0.93 g/cm$^3$.

The main melting temperature of the used LLDPE advantageously ranges between 120° C. and 160° C. for molar masses of the LLDPE greater than 50,000 g/mol. Its secondary melting temperature ranges between 50° C. and 90° C. corresponding to short chains, of molar mass smaller than 8,000 g/mol.

It is further desirable for the used LLDPE to contain a few polar groups which could ensure the compatibility with PEG, stearic acid, and the waxes used. These groups may be of carbonyl, carboxyl, ester, or ketone type. They typically are by a number of from 1 to 5 groups, every 100 carbons, in average. Unsaturated bonds are not desired and should not exceed 5 unsaturations for 1,000 carbons since they generate reticulation and thus non-fusible areas (batch stones). This also results in a local increase of the viscosity of the mixture, which is not desired for the homogeneity of the master batch.

Advantageously, the lubricant is a paraffin wax, of composition ($C_nH_{n+2}$) with n varying between 18 and 50, commonly called paraffin wax or polyethylene wax according to the proportion of small chains with respect to large polyethylene chains. Such waxes may contain unsaturated bonds, which are desirable, to graft on the LLDPE and/or PEG chains. The unsaturation rate of the paraffin wax and/or of the polyethylene wax (low and high molar masses, respectively) should be greater than 10%, preferably 50%. The mixtures thereof, having a melting temperature ranging between 30 and 90° C., a molar mass between 200 and 1,500 g/mol, and a density ranging between 0.5 and 0.99 g/cm³, advantageously between 0.7 and 0.8 g/cm³, are advocated in the elaboration of the master batch according to the invention.

The presence of paraffin wax is important for the lubrication of the injection press and to lower the viscosity of the mixture due to the presence of short chains. A high paraffin ratio enables to incorporate a greater amount of powder. However, there should not be too much paraffin wax to avoid weakening green parts after injection, which would systematically be broken on ejection.

Advantageously, the plasticizing polymer is PEG (polyethylene glycol), or possibly POE (Polyoxyethylene), or ethylene carbonate.

A polyethylene glycol used in the context of the present invention is advantageously characterized by a molar mass ranging between 1,000 and 100,000 g/mol, more advantageously still between 15,000 and 45,000 g/mol. It is indeed preferable to use a PEG of high molar mass (for example, 20,000) since the mixing temperatures are high and PEGs of high molar mass degrade less rapidly at high temperature than PEGs of low molecular mass or ethylene carbonates.

The PEG used is also characterized by a density advantageously ranging between 1.1 and 1.4 g/cm³ and a melting temperature advantageously ranging between 15 and 70° C.

Typically according to the invention, the stable polymer is present by a majority mass proportion with respect to the lubricant and to the plasticizing polymer. In other words, advantageously, the mass of the stable polymer is greater than or equal to that of the lubricant, or even to that of the plasticizer.

In practice, and for an organic mixture amounting to 100% by mass, it comprises:
  a stable polymer having good ductility features, advantageously a LLDPE, from 30 to 90% by mass of the organic mixture;
  a lubricant, from 5 to 50%, or even from 5 to 40%, or even from 10 to 40% by mass of the organic mixture;
  a plasticizing polymer, from 5 to 30% by mass of the organic mixture; with a [% by mass of the lubricant]/[% by mass of the stable polymer] ratio smaller than or equal to (≤) 1, advantageously strictly smaller (<) than 1.

More advantageously still, the organic mixture comprises:
  a stable polymer having good ductility features, advantageously LLDPE, from 40 to 90% by mass of the organic mixture;
  a lubricant, from 5 to 40%, or even from 10 to 40% by mass of the organic mixture;
  a plasticizing polymer, from 5 to 30% by mass of the organic mixture; with a [% by mass of the lubricant]/[% by mass of the stable polymer] ratio smaller than or equal to (≤) 1, advantageously strictly smaller (<) than 1.

According to a preferred embodiment, the mass proportions of these three polymers in the organic mixture are as follows:
  from 30 to 90%, advantageously from 40 to 90% by mass of LLDPE;
  from 5 to 50%, advantageously from 5 to 40%, more advantageously still from 10 to 40% by mass of paraffin wax (PW); and
  from 5 to 30% by mass of PEG.

Further, the [% PW by mass]/[% LLDPE by mass] ratio is advantageously smaller than or equal to 1, more advantageously still smaller than 1.

In other words, a mass of LLDPE at least equal to the mass of paraffin wax should be introduced into the formulation, with a low quantity of PEG.

Indeed, PEG is added not to promote the water debinding, although it may be used for this purpose, but to add resilience to the mixture due to its short chains and to its polarity which makes it little soluble in LLDPE. It is thus introduced in a low quantity (from 5 to 30% by mass of the organic mixture).

As already mentioned, such a master batch is advantageously used to form a part especially made of ceramic or metal, molded by extrusion or injection. It advantageously is a thermoplastic injection since, according to a preferred embodiment, the master batch according to the invention contains neither solvent, especially organic, nor water.

According to another aspect, the present invention also relates to a method for forming a molded part which comprises the steps of:
  preparing a master batch according to the invention;
  injecting said mixture into a mold to form the part;
  debinding the part;
  sintering the part.

Preferred embodiments are the following:
  the master batch is prepared in a mixer or in an extruder, advantageously, under an inert gas flow;
  the master batch is milled before its injection;
  the debinding is a thermal debinding, advantageously performed at a temperature ranging between 0 and 500° C., more advantageously still with temperature stages;
  if the inorganic powder is a ceramic powder, then the debinding is performed under air;
  if the inorganic powder is a metal powder, then the debinding is performed under a neutral atmosphere or vacuum.

In practice, the preparation of the mixtures according to the invention is performed in a chamber heated to the melting temperature of the stable polymer, advantageously LLDPE, which is stirred by one or several horizontal rotors. The rotors should be able to generate a turbulent flow in the mixture.

The mixing may for example be performed in a mixer or in an extruder.

More specifically, this mixing is performed in three steps:
1/ integration of all elements in the hot chamber;
2/ mixing of the components at constant temperature;
3/ cooling of the mixture.

The implementation is preferably performed under a flow of inert gas, such as Ar, to avoid the oxidation via the unsaturated bonds of the polymer.

If the mixing is performed in a mixer with horizontal rotors, the detailed implementation is the following:
1/ the chamber is heated to the melting temperature of LLDPE: The latter is inserted into the chamber at the melting temperature with PEG. Part of the paraffin wax is then added (approximately 30% of the provided mass of paraffin wax).
2/ powder integration phase: the powder is previously mixed with stearic acid and this mixture is progressively integrated to the polymers during the mixing, each time the torque stabilizes. The paraffin wax is added little by little during powder additions. All the paraffin wax is introduced before the end of the powder additions.
3/ At the end of the powder additions and when the rotor torque is stabilized, the mixture is cooled and extracted from the chamber.
4/ The mixture is then milled and ready to be injected.

This mixing may also be performed in an extruder with one or several successive runs according to the following operating mode:
1/ All the polymers and part of the powder (advantageously from 50 to 75% of the total mass of powder) are inserted into one or several feeders.

2/ First run through the extruder and obtaining of a master batch filled with little powder.
3/ Milling of the master batch in a pellet mill.
4/ Insertion of the pellets resulting from the first run and of the rest of the powder into one or several feeders.
5/ Second run through the extruder with all components (polymers and powder).
6/ Milling of the resulting master batch which is totally filled.
7/ Third run to homogenize the master batch.
8/ Pellet milling of the obtained mixture for the injection.

The extruder screw rotates at a speed on the order of 150 rpm.

Once the master batch has been fowled, it is injected into an injection press and molded. The resulting parts are then debound thermally (and/or by solvent and/or water) and then sintered.

The debinding temperatures range between 0 and 500° C. and the temperature ramps are very slow to avoid the occurrence of cracks (between 5 and 150° C./h, preferably 12° C./h). The debinding is more generally performed under air for ceramics and under a neutral atmosphere or vacuum for oxidizable metals.

It is possible to know the debinding temperatures which should be used to debind at best the sample by thermogravimetric analysis measurements (TGA), using a thermogravimetric apparatus.

The measurement of the mass loss of the master batch according to temperature provide the degradation temperatures of the polymers used, in the case in point close to 450° C.-500° C. for LLDPE and more diffuse (between 100° C. and 450° C.) for paraffin wax, PEG, and stearic acid, since these three elements have close degradation temperatures.

Such degradation temperatures depend on the debinding kinetics and the atmosphere used.

The sintering is dependent on the powder used, and corresponds to the temperature cycles determined on the initial powder, and such as used in conventional powder metallurgy.

DETAILED DESCRIPTION OF THE INVENTION

The following non-limiting embodiments aim at illustrating the invention.
1/ Composition of the master batches:

EXAMPLE 1

The powder used is a partially yttria-stabilized zirconia powder (5% by mass) atomized into spheres of a few tens of microns with crystallites having an average 36-nm size (Tosoh Corporation).

It is mixed with LLDPE, paraffin wax, PEG 20,000, and stearic acid, in the following proportions:
 49% by mass of LLDPE;
 29% by mass of PEG 20,000;
 22% by mass of PW (polyethylene wax);
that is, 100% by mass.

Stearic acid (SA) is added up to 7.8% by mass of the total of the ternary mixture (LLDPE+PEG+PW).
That is, SA mass=0.078*(mLLDPE+mPEG+mPW).

The mixture is here filled with powder up to 53% by volume of the total volume of the master batch (Vtotal=powder+AS+LLDPE+PEG+PW).
That is, Vpowder=0.53*Vtotal
and Vpolymer fraction (AS+LLDPE+PEG+PW)=0.47*Vtotal.

EXAMPLE 2

A mixing is performed with copper powder of rounded morphology with a 12 μm grading (d50) with LLDPE, polyethylene wax (PW), PEG 20,000, and stearic acid, by the following proportions:
 55% by mass of LLDPE;
 17% by mass of PEG 20,000; and
 28% by mass of PW
that is, 100% by mass.

Stearic acid (SA) is added up to 7.8% by mass of the total of the ternary mixture (LLDPE+PEG+PW).

The mixture is here filled with powder up to 60% by volume.

In these two examples, the polymers used have the following specifications:
 LLDPE: EXXO MOBIL; density=0.921 g/cm$^3$; primary melting temperature=60° C.; secondary melting temperature=130° C.
 PW (polyethylene wax): SER 70H; density=0.77 g/cm$^3$; melting temperature=73° C.
 SA (stearic acid): Sigma Aldrich; density=0.845 g/cm$^3$;
 PEG 20,000 (polyethylene glycol 20,000 g/mol): density=1.2 g/cm$^3$.

2/ Manufacturing of parts:

The mixings are performed in an extruder with the above-described operating mode.

The debinding of zirconia is performed thermally under air, by thermo-oxidation at 12° C./h up to 300° C. with a holding period of 3 h at this temperature, and then at 12° C./h up to 400° C., with a holding period of 1 h at this temperature. The sintering is carried out at 300° C. 1 h up to 1,500° C. for 5 h.

The copper debinding is performed under a neutral atmosphere (Argon or Nitrogen) up to 500° C. at 12° C/h with a 4 h holding period.

The sintering is performed under a reducing atmosphere, ArH$_2$ or pure H$_2$ or also under vacuum, for example, for 2 h at 900° C. with a 300° C./h ramp, as well as a low-temperature stage to deoxidize the copper, typically 200-400° C.

The invention claimed is:

1. A method for manufacturing a molded part comprising the steps of:
 preparing a master batch comprising:
  at least one ceramic or metallic powder; and
  an organic mixture comprising:
   a linear low density polyethylene as a stable polymer having good ductility features, from 30 to 90% by mass of the organic mixture;
   a paraffin wax as a lubricant, from 5 to 50% by mass of the organic mixture; and
   polyethylene glycol as a plasticizing polymer, from 5 to 30% by mass of the organic mixture;
   with a [% by mass of the lubricant]/[% by mass of linear low density polyethylene] ratio smaller than or equal to 1:
 injecting said master batch into a mold to form the part;
 thermally debinding the part at a temperature ranging between 300 and 500° C.; and
 sintering the part.

2. The method for manufacturing a molded part of claim 1, wherein the organic mixture comprises:
 a linear low density polyethylene as a stable polymer having good ductility features, from 40 to 90% by mass of the organic mixture;
 a paraffin wax as a lubricant, from 5 to 40% by mass of the organic mixture;

polyethylene glycol as a plasticizing polymer, from 5 to 30% by mass of the organic mixture.

3. The method for manufacturing a molded part of claim 2, wherein the lubricant is from 10 to 40% by mass of the organic mixture.

4. The method for manufacturing a molded part of claim 1, wherein the [% by mass of the lubricant]/[% by mass of linear low density polyethylene] ratio is less than 1.

5. The master method for manufacturing a molded part of claim 1, wherein the master batch contains neither solvent nor water.

6. The master method for manufacturing a molded part of claim 1, wherein the ceramic or metallic powder amounts to from 40 to 75% by volume of the master batch.

7. The method for manufacturing a molded part of claim 1, wherein the master batch further contains a dispersing agent.

8. The method for manufacturing a molded part of claim 7, wherein the dispersing agent is stearic acid.

9. The method for manufacturing a molded part of claim 7, wherein the dispersing agent is added in an amount from 1 to 20% by mass of the organic mixture.

10. The method for manufacturing a molded part of claim 1, wherein the master batch is prepared in a mixer or in an extruder.

11. The method for forming the part of claim 10, wherein the master batch is prepared under an inert gas flow.

12. The method for manufacturing a molded part of claim 1, wherein the master batch is milled before injecting.

13. The method for manufacturing a molded part of claim 1, wherein the injecting is thermoplastic injection.

14. The method for forming the part of claim 1, wherein the debinding is performed in temperature stages.

* * * * *